(12) United States Patent
Headley

(10) Patent No.: US 8,831,831 B2
(45) Date of Patent: Sep. 9, 2014

(54) TRAILER BACKING AID USING GPS MAPPING AND CAMERA IMAGE DISPLAY

(75) Inventor: Philip M. Headley, Brighton, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 98 days.

(21) Appl. No.: 13/331,380

(22) Filed: Dec. 20, 2011

(65) Prior Publication Data

US 2013/0158803 A1   Jun. 20, 2013

(51) Int. Cl.
*G05D 1/02* (2006.01)
*B62D 13/06* (2006.01)

(52) U.S. Cl.
USPC ............ 701/41; 701/1; 701/36; 701/42

(58) Field of Classification Search
CPC ............... B62D 13/06; B62D 15/028
USPC ............................ 701/1, 36, 41, 42
See application file for complete search history.

(56) References Cited

U.S. PATENT DOCUMENTS

| | | | |
|---|---|---|---|
| 6,292,094 B1 * | 9/2001 | Deng et al. | 340/431 |
| 7,154,385 B2 | 12/2006 | Lee | |
| 2004/0260439 A1 * | 12/2004 | Endo et al. | 701/36 |
| 2005/0074143 A1 * | 4/2005 | Kawai | 382/104 |
| 2007/0027581 A1 | 2/2007 | Bauer et al. | |
| 2007/0198190 A1 | 8/2007 | Bauer et al. | |

FOREIGN PATENT DOCUMENTS

| | | |
|---|---|---|
| DE | 9208595 U1 | 8/1992 |
| DE | 10065230 A1 | 12/2002 |
| DE | 10200903911 A1 | 3/2011 |
| EP | 1486400 A2 | 2/2007 |

OTHER PUBLICATIONS

U.S. Appl. No. 13/005,644, Published: Jul. 19, 2012.
European Search Report, dated Mar. 18, 2014.

* cited by examiner

*Primary Examiner* — Fadey Jabr
*Assistant Examiner* — Yazan A Soofi

(57) ABSTRACT

A method of controlling a vehicle and trailer assembly comprises initiating an input mode for a trailer backing system. A first set of data points, a second set of data points, and a third set of data points are input into the trailer backing system. The input mode for the trailer backing system is ended. An intended backing path is determined based upon the first, second, and third set of data points.

23 Claims, 3 Drawing Sheets

TRAILER BACKING AID USING GPS MAPPING AND CAMERA IMAGE DISPLAY

TECHNICAL FIELD

The present disclosure relates to automotive vehicles and more particularly to advance driver assistance programs for automotive vehicles.

BACKGROUND

Backing of trailers attached to vehicles often requires multiple persons to effectively control the vehicle and direct the path the vehicle and trailer are required to travel. Additionally, those unaccustomed to operating vehicle and trailer systems may have some difficulty in accurately controlling the path of the trailer, particularly when backing the vehicle and trailer.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of controlling a vehicle and trailer assembly comprises initiating an input mode for a trailer backing system. A first set of data points, a second set of data points, and a third set of data points are input into the trailer backing system. The input mode for the trailer backing system is ended. An intended backing path is determined based upon the first, second, and third set of data points.

A method of controlling a vehicle and trailer assembly comprises initiating an input mode for a trailer backing system. A first set of data points are input into the trailer backing system. The first set of data points utilizes a GPS system to determine a current position of the vehicle and trailer assembly. A second set of data points are input into the trailer backing system. The second set of data points utilizes the GPS system to determine a final position for the vehicle and trailer assembly. A third set of data points are input into the trailer backing system. The third set of data points utilize the GPS system to determine a current position of obstacles proximate to the current and the final positions of the vehicle and trailer assembly. The input mode for the trailer backing system is ended. An intended backing path is determined based upon the first, second, and third set of data points.

A method of controlling a vehicle and trailer assembly comprises obtaining a camera image for a current position of the vehicle and trailer assembly from a camera mounted to one of a vehicle and a trailer for the vehicle and trailer assembly. The camera image is displayed on a display screen for a trailer backing system. An input mode for the backing system is initiated. A first set of data points, a second set of data points, and a third set of data points are input into the trailer backing system. The input mode for the backing system is ended. An intended backing path is determined based upon the first, second, and third set of data points.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
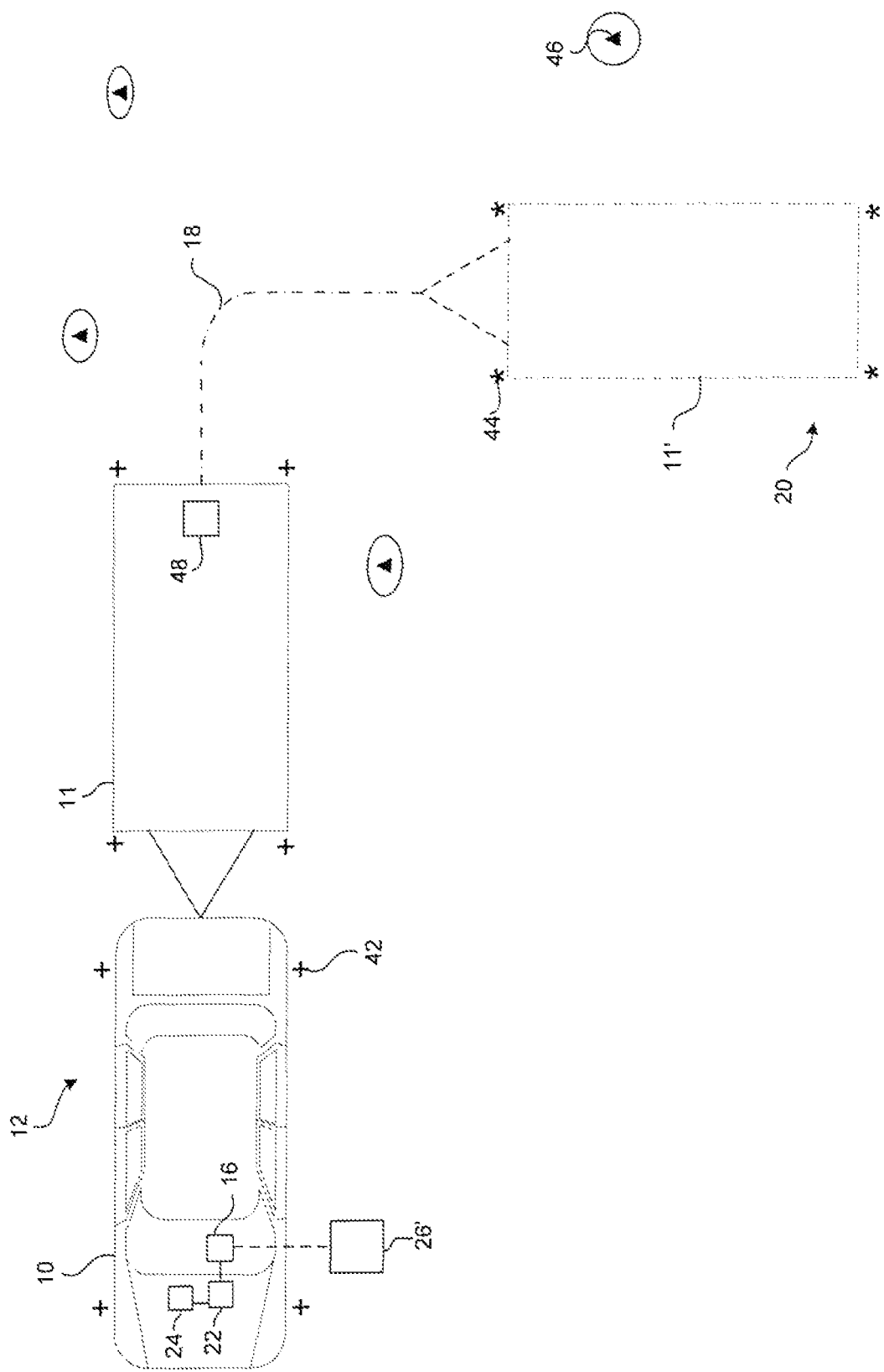
FIG. 1 is a schematic diagram of a first embodiment for a trailer backing system of the present invention.

The following description is merely exemplary in nature and is in no way intended to limit the disclosure, its application, or uses. For purposes of clarity, the same reference numbers will be used in the drawings to identify similar elements. FIG. 1 illustrates a vehicle 10 and a trailer 11. The trailer 11 is controllably secured to the vehicle 10 to form a vehicle and trailer assembly 12. The vehicle and trailer assembly 12 utilizes a trailer backing program 14 of the present invention. The trailer backing program 14 provides the vehicle operator with an arrangement of defining an intended backing path 18 of the vehicle and trailer assembly 12. The trailer backing program 14 utilizes the intended backing path 18 to control movement of vehicle and trailer assembly 12 along the intended backing path.

An electronic input device 16 is electronically connected to the vehicle 10 and the trailer backing program 14. The trailer backing program 14 includes a control unit 22 within the vehicle 10. The control unit 22 may be connected to at least one vehicle system 24 such as a powertrain system, a steering system and/or a braking system to control and direct movement of the vehicle and trailer assembly 12. The control unit 22 sends instructions to the vehicle systems 24 to move the vehicle and trailer assembly 12 along the intended backing path 18 to a final location 20. The steering, braking, and other controls required are calculated by the control unit 22 based upon the intended backing path 18 input by the vehicle operator.

The electronic input device 16 includes an input control mechanism 26 and a display screen 28. The electronic input device 16 may be all or partially incorporated into the vehicle 10. The electronic input device 16 may include a control panel and touch screen already within the vehicle 10, e.g. part of a navigation system or entertainment unit, may be a separate electronically connectable device, such as a smart phone, GPS, or a wireless handheld device that is electrically connected to the vehicle 10. The electronic input device 16 may be connected through a wired connection, such as a USB connector, or may be wirelessly linked with the vehicle.

The electronic input device 16 includes at least one input control mechanism 26 for inputting directions into the trailer backing system 14. A first set of data points 42 including various origin points from the vehicle 10 and the trailer 11 are input into the backing system 14 using the input control mechanism 26. A second set of data points 44 representing the final location of at least the trailer 11' is input into the backing system 14 as well. The second set of data points 44 representing the final location 20 may be input by one or more destination points. Additionally, a third set of data points 46 that represent obstacles may be input and shown on the display screen 28 as well. The obstacles may be objects in the proximate area of the vehicle and trailer assembly 12, the final location 20 and the backing path 18. The backing system 14 determines the specific backing path 18 including the distances and steering required at each location. However, an operator of the vehicle and trailer assembly 12 would be able to determine obstacles in the proximate area of the backing path 18 that should be avoided.

The input device 16 may be part of a navigation or GPS systems and the input control mechanism 26 may be separately connected to or incorporated into the vehicle 10. For example, the input control mechanism 26 may be a hand held electronic device such as a key fob or "smart phone". The input control mechanism 26 may be a hand-held device that can be carried to the each data point and the corresponding coordinates for that location may be entered into the trailer backing system 14. The coordinates may be GPS coordinates and/or coordinates that provide relative distances to the vehicle and trailer assembly 12 and/or to one another for increased accuracy of the recorded locations.

The input device 16 may include a camera 48 mounted to the exterior of the vehicle and trailer assembly 12. The display screen 28 may illustrate a schematic or image of an area located behind the vehicle and trailer assembly 12 provided by the exterior mounted camera 48. The data point locations 42, 44, 46 recorded by the input control mechanism 26 can be shown on the schematic or camera image.

Alternatively, the input control mechanism 26 may be a joystick, knob, slider device, physical buttons, or virtual "touch screen" buttons. The input control mechanism 26 can be manipulated to move the "on screen" locator 40 on the display screen 28 and select the location for the data points 42, 44, 46.

Figure 2:
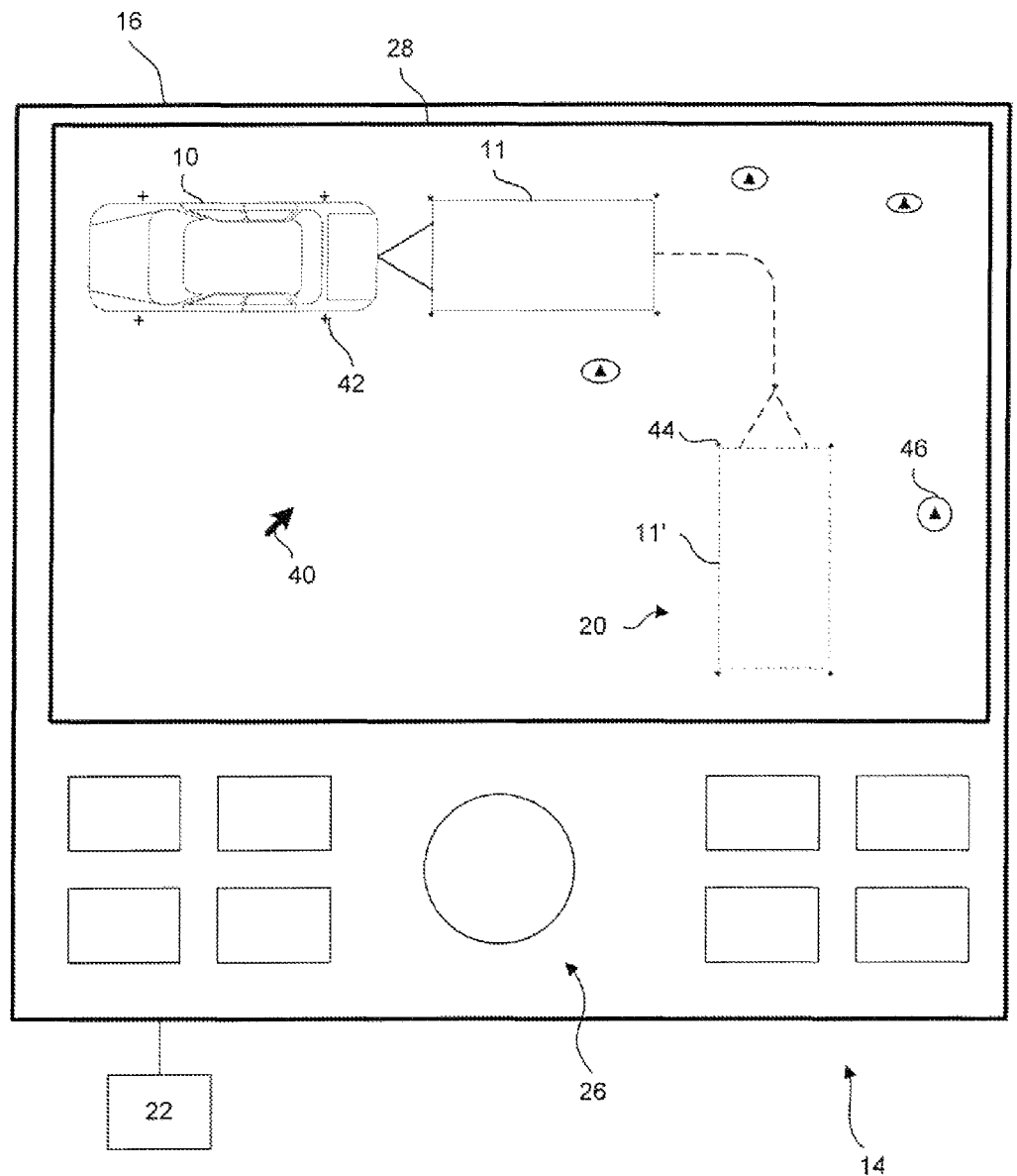
FIG. 2 is a schematic illustration of the backing system for the vehicle and trailer of FIG. 1.

FIG. 2 illustrates the electronic input device 16 for the backing system 14. The display screen 28 shows the vehicle and trailer assembly 12. The display screen 28 can show a schematic representation of the vehicle and trailer assembly 12 and the surrounding environment, or utilize the camera 48 to capture an image of the surrounding area. If a camera 48 is utilized the destination points 44 and the obstacles 46 may be aligned with what is shown on the display screen 28. In this instance the vehicle and trailer assembly 12 may not be visible on the display screen 28. The input control mechanism 26' may control the on screen locator 40 to identify the obstacles 46, or may be a handheld electronic device and carried to each of the data point locations to capture the coordinates.

Figure 3:
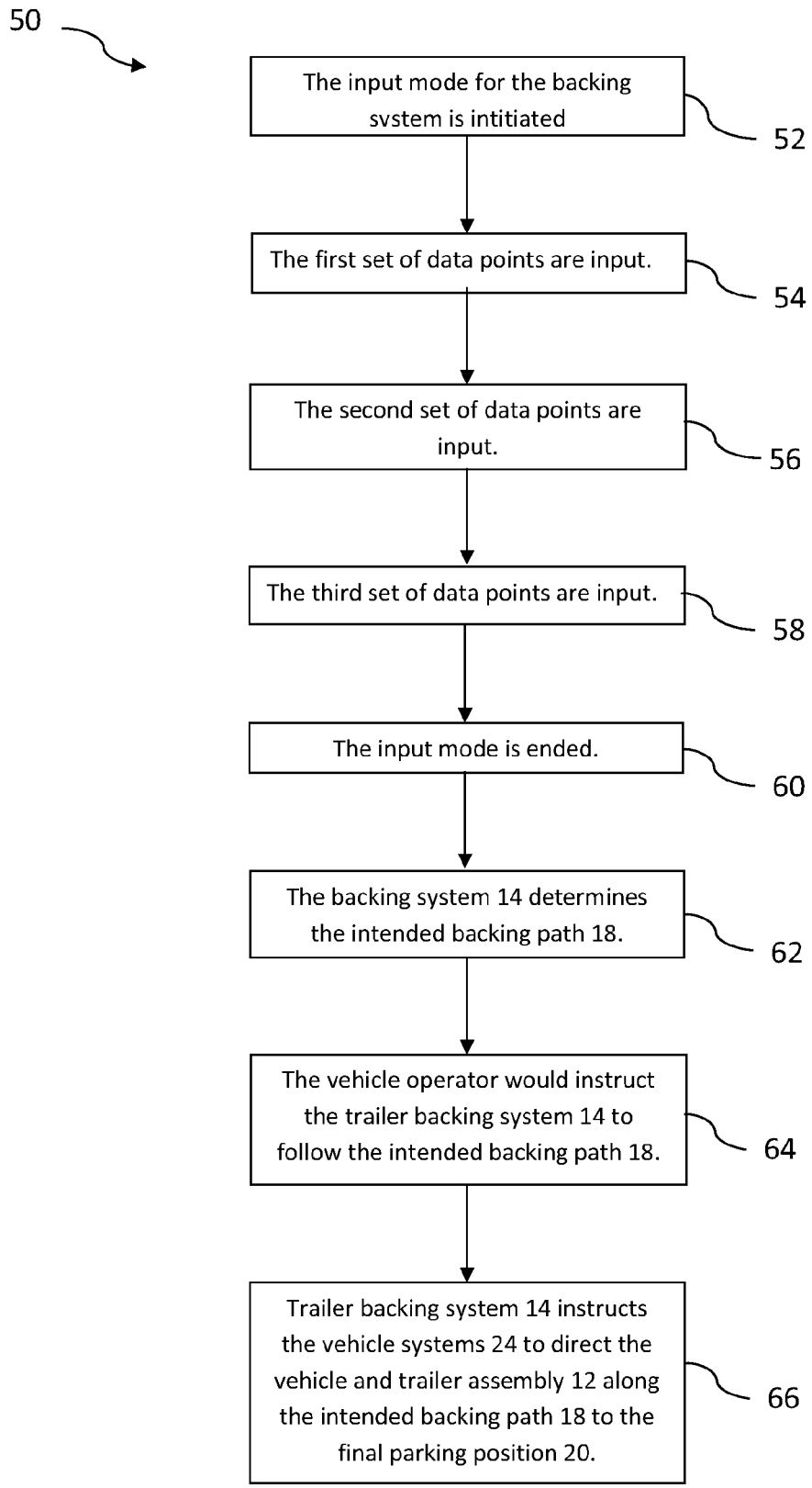
FIG. 3 is a schematic illustration of a method for utilizing the trailer backing system program of FIGS. 1 and 2.

FIG. 3 illustrates an embodiment of a method of using the trailer backing system 14, shown at 50. The input mode for the backing system 14 is initiated, step 52. A vehicle operator would use the electronic input device 16 to input the first set of data points, step 54. For example, the operator selects input of the first set of data points. Using a hand held input control mechanism 26 (Smart phone, PDA, handheld GPS, Key-fob, etc) the operator walks to each data point 42 required, i.e. the corners of the vehicle 10 and the trailer 11, and selects each data point location. Alternatively, the operator may move the on-screen pointer 40 to each data point 42 and select that data point location. It may only be necessary to select one of the first set of data points, because the overall dimensions of the vehicle and trailer assembly 12 are known and input in the backing system 14. Therefore, the first set of data points 42 can be calculated based on the one data point location that is entered.

The second set of data points 44 are input next in a similar manner, step 56. Using the controller 26 the operator may enter the second set of data points 44 by walking to each data point 44 and selecting that location or moving the on-screen locator 40. Again, it may only be necessary to select one of the second set of data points 44, because the overall dimensions of the vehicle and trailer assembly 12 are known and input in the backing system 14. Therefore, the second set of data points 44 can be calculated based on the one data point location that is entered.

The third set of data points 46 are input, step 58. The vehicle operator would enter all of the third set of data points 46 representing obstacles in a manner similar to entering the first and second set of data points. Once all the data points 46 representing obstacles are individually entered the operator may end the input mode, step 60. The backing system 14 would determine the intended backing path 18, step 62. The intended backing path 18 would include the steering and braking required by the vehicle 10 to move the vehicle and trailer assembly 12 to the final location 20 while avoiding the defined obstacles 46. The intended backing path 18 would include the suggested backing route and a final parking position 20. The vehicle operator instructs the trailer backing system 14 to follow the intended backing path 18, step 64. The trailer backing system 14 would send instructions to the required vehicle systems 24 to direct the vehicle and trailer assembly 12 along the intended backing path 18 to the final location 20, step 66.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of controlling a vehicle and trailer assembly comprising:
    initiating an input mode on an electronic input device associate with an electronic control unit for a trailer backing system;
    inputting a first set of data points including inputting at least one data point relating to a current position of at least one of a vehicle and a trailer of the vehicle and trailer assembly;
    inputting a second set of data points including inputting at least one data point relating to a final position of at least one of a vehicle and a trailer of the vehicle and trailer assembly;
    inputting a third set of data points including inputting at least one data point for each obstacle proximate to a current vehicle and trailer assembly position and the final vehicle and trailer assembly position;
    ending the input mode;
    determining an intended backing path based upon the first, second, and third set of data points.

2. The method of claim 1 further comprising calculating with the electronic control unit least one movement necessary for the vehicle and trailer assembly to follow the intended backing path and instructing at least one vehicle system with the trailer backing system to direct the vehicle and trailer assembly along the intended backing path.

3. The method of claim 1, wherein inputting the first set of data points further comprises calculating the remaining data points in the first set of data points based upon the at least one data point and data relating to the vehicle and trailer assembly configuration previously stored in the trailer backing system.

4. The method of claim 1, wherein inputting the second set of data points further comprises calculating the remaining data points in the second set of data points based upon the at least one data point and data relating to the vehicle and trailer assembly configuration previously stored in the trailer backing system.

5. The method of claim 1 further comprising:

obtaining a camera image for a current position of the vehicle and trailer assembly from a camera mounted to one of a vehicle and a trailer for the vehicle and trailer assembly;

obtaining a GPS location for a current position of the vehicle and trailer assembly; and indicating the current position on the image display based upon the first set of data points and the GPS data.

6. The method of claim 5, wherein inputting the first set of data points, the second set of data points, and the third set of data points further comprises moving a locator on the display screen to each of the data point locations on the image and marking that location on the image as a data point.

7. The method of claim 5, wherein inputting the first set of data points, the second set of data points, and the third set of data points further comprises moving a hand-held locator to each data point location and selecting that location, and transferring the selected data point locations from the hand-held locator to the trailer backing system.

8. The method of claim 5, wherein indicating the current position on the image display based upon the first set of data points and the GPS data further comprises adjusting the GPS location for the current position of the vehicle and trailer assembly to align with the camera image.

9. A method of controlling a vehicle and trailer assembly comprising:

initiating an input mode with an electronic control unit for a trailer backing system;

inputting a first set of data points into the electronic control unit for trailer backing system, wherein the first set of data points utilize a GPS system to determine a current position of the vehicle and trailer assembly;

inputting a second set of data points into the electronic control unit for the trailer backing system, wherein the second set of data points utilize the GPS system to determine a final position for the vehicle and trailer assembly;

inputting a third set of data points into the electronic control unit for the trailer backing system, wherein the third set of data points utilize the GPS system to determine a current position of obstacles proximate to the current and the final positions of the vehicle and trailer assembly;

wherein inputting the first set of data points, the second set of data points, and the third set of data points further comprises moving a hand-held locator to each data point location and selecting that location, and transferring the selected data point locations from the hand-held locator to the electronic control unit for the trailer backing system;

ending the input mode;

determining an intended backing path based upon the first, second, and third set of data points.

10. The method of claim 9, further comprising calculating with the electronic control unit at least one movement necessary for the vehicle and trailer assembly to follow the intended backing path and instructing at least one vehicle system with the backing system to direct the vehicle and trailer assembly along the intended backing path.

11. The method of claim 9, wherein inputting the first set of data points further comprises inputting at least one data point of at least one of a vehicle and a trailer of the vehicle and trailer assembly and calculating the remaining data points in the first set of data points based upon the at least one data point and data relating to the vehicle and trailer assembly configuration previously stored in the trailer backing system.

12. The method of claim 9, wherein inputting the second set of data points further comprises inputting at least one data point of at least one of a vehicle and a trailer of the vehicle and trailer assembly and calculating the remaining data points in the second set of data points based upon the at least one data point and data relating to the vehicle and trailer assembly configuration previously stored in the trailer backing system.

13. The method of claim 9, wherein inputting the third set of data points further comprises inputting at least one data point for each obstacle proximate to a current vehicle and trailer assembly position and the final vehicle and trailer assembly position.

14. A method of controlling a vehicle and trailer assembly comprising:

obtaining a camera image for a current position of the vehicle and trailer assembly from a camera mounted to one of a vehicle and a trailer for the vehicle and trailer assembly;

displaying the camera image on a display screen for a trailer backing system;

initiating an input mode with an electronic control unit for the trailer backing system;

inputting a first set of data points into the electronic control unit for the trailer backing system;

inputting a second set of data points into the electronic control unit for the trailer backing system;

inputting a third set of data points into the electronic control unit for the trailer backing system including inputting at least one data point for each obstacle proximate to a current vehicle and trailer assembly position and the final vehicle and trailer assembly position;

ending the input mode; and determining an intended backing path based upon the first, second, and third set of data points, including determining the relative distances between the first, second and third set of data points, and a route from the first set of data points to the second set of data points, wherein the route is calculated to avoid the third set of data points.

15. The method of claim 14, further comprising calculating with the electronic control unit at least one movement necessary for the vehicle and trailer assembly to follow the intended backing path and instructing at least one vehicle system with the trailer backing system to direct the vehicle and trailer assembly along the intended backing path.

16. The method of claim 14, wherein inputting the first set of data points further comprises inputting at least one data point relating to a current position of at least one of a vehicle and a trailer of the vehicle and trailer assembly and calculating the remaining data points in the first set of data points based upon the at least one data point and data relating to the vehicle and trailer assembly configuration previously stored in the trailer backing system.

17. The method of claim 14, wherein inputting the second set of data points further comprises inputting at least one data point relating to a final position of at least one of a vehicle and a trailer of the vehicle and trailer assembly and calculating the remaining data points in the second set of data points based upon the at least one data point and data relating to the vehicle and trailer assembly configuration previously stored in the trailer backing system.

18. The method of claim 14, wherein inputting the first set of data points, the second set of data points, and the third set of data points further comprises moving a locator on the display screen to each of the data point location on the image.

19. The method of claim 1, wherein determining an intended backing path based upon the first, second, and third set of data points further comprises:

determining the relative distances between the first, second and third set of data points; and determining a route from the first set of data points to the second set of data points, wherein the route is calculated to avoid the third set of data points.

20. The method of claim 7, wherein the hand-held locator is one of a smart phone, personal digital assistant, handheld GPS, and key fob.

21. The method of claim 9, wherein determining an intended backing path based upon the first, second, and third set of data points further comprises:
   determining the relative distances between the first, second and third set of data points; and
   determining a route from the first set of data points to the second set of data points, wherein the route is calculated to avoid the third set of data points.

22. The method of claim 9, wherein the hand-held locator is one of a smart phone, personal digital assistant, handheld GPS, and key fob.

23. The method of claim 14, wherein inputting the first set of data points, the second set of data points, and the third set of data points further comprises moving a hand-held locator to each data point location and selecting that location, and transferring the selected data point locations from the hand-held locator to the trailer backing system and, wherein the hand-held locator is one of a smart phone, personal digital assistant, handheld GPS, and key fob.

* * * * *